A. T. DAWSON & G. T. BUCKHAM.
BARREL CARRIAGE FOR ORDNANCE.
APPLICATION FILED DEC. 28, 1910.
1,128,591.                                  Patented Feb. 16, 1915.
                                                3 SHEETS—SHEET 2.
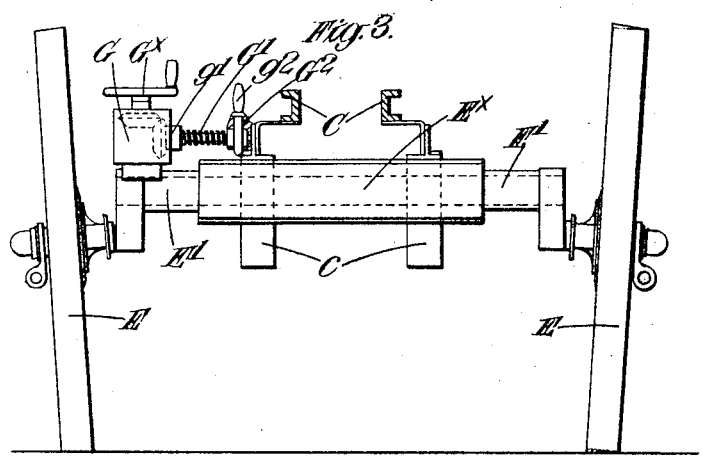
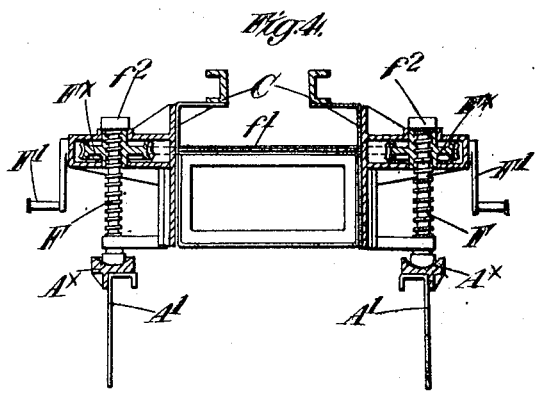
Witnesses:
Frank Hennessy
Anna L. Kearney
Inventors:
Arthur Trevor Dawson
& George Thomas Buckham
By Pennie & Goldsborough
Attys.

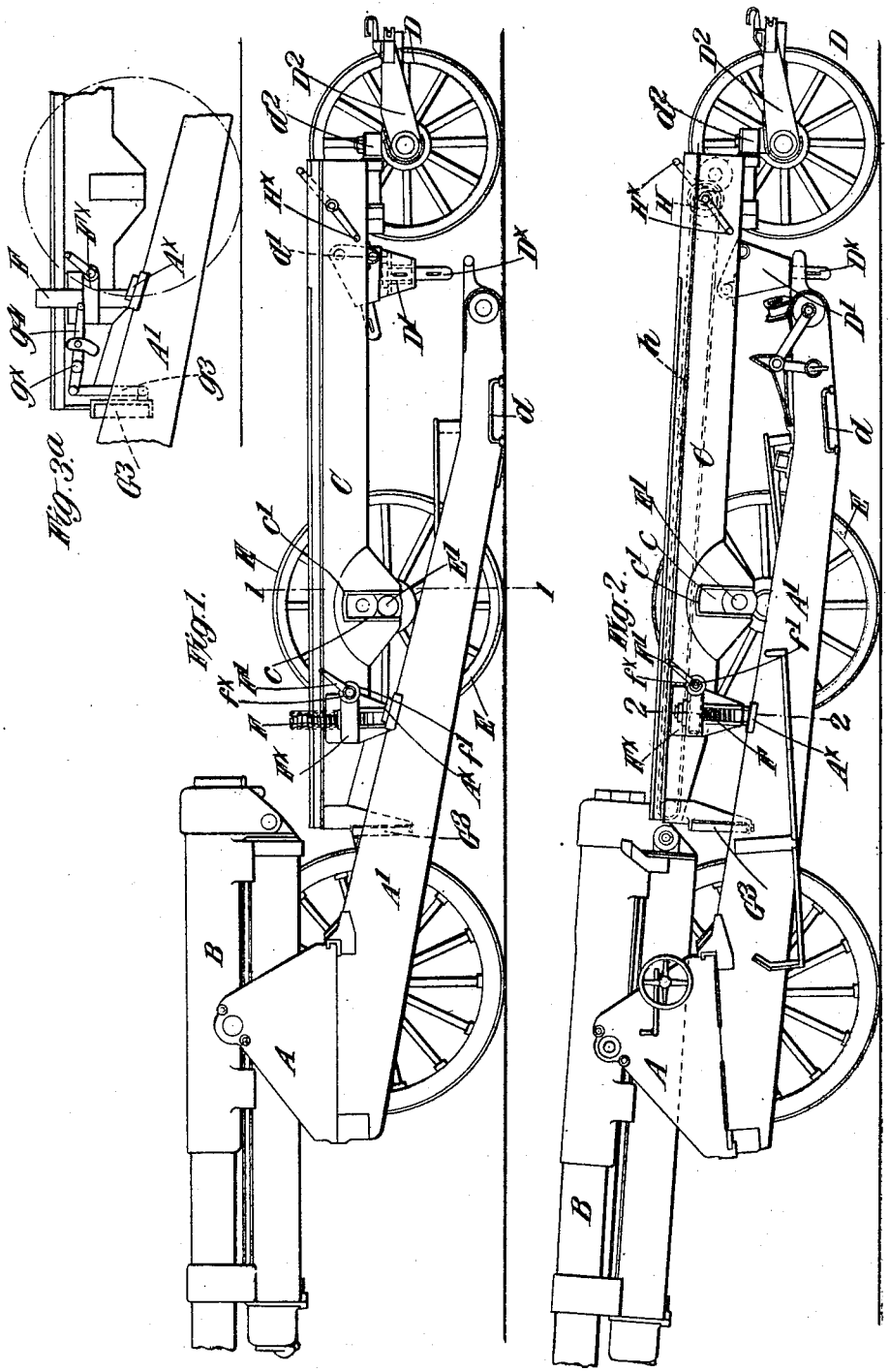

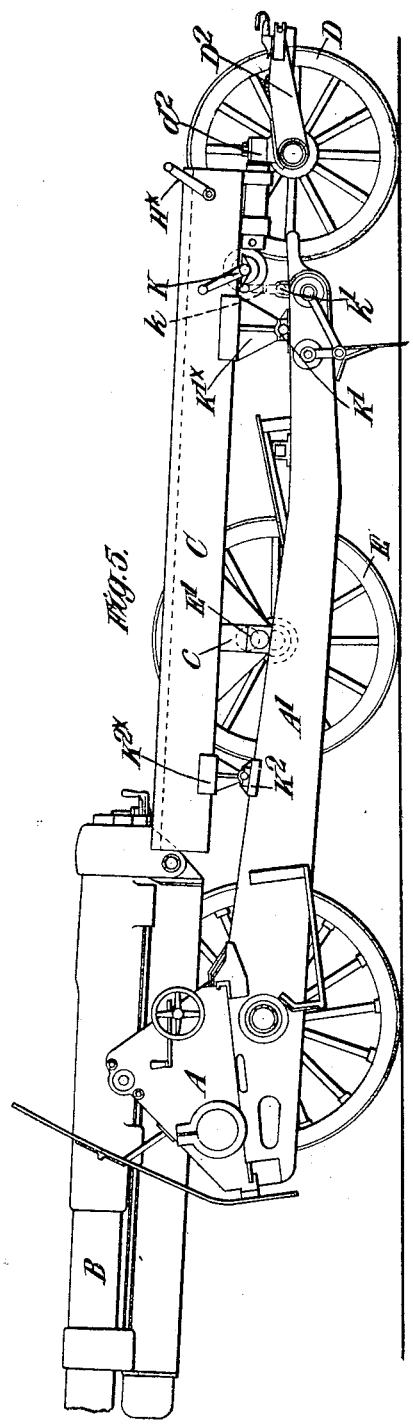

UNITED STATES PATENT OFFICE.

ARTHUR TREVOR DAWSON AND GEORGE THOMAS BUCKHAM, OF LONDON, ENGLAND, ASSIGNORS, BY MESNE ASSIGNMENTS, TO VICKERS LIMITED, OF WESTMINSTER, ENGLAND.

BARREL-CARRIAGE FOR ORDNANCE.

1,128,591.      Specification of Letters Patent.      Patented Feb. 16, 1915.

Application filed December 28, 1910. Serial No. 599,722.

*To all whom it may concern:*

Be it known that we, Sir ARTHUR TREVOR DAWSON, knight, and GEORGE THOMAS BUCKHAM, both subjects of the King of Great Britain, residing at 32 Victoria street, Westminster, in the county of London, England, have invented certain new and useful Improvements in and Relating to Barrel-Carriages for Ordnance, of which the following is a specification.

This invention relates to barrel carriages of the kind that are provided with two pairs of wheels and with means for enabling the main frame to be connected with the rear end of the trail after the barrel carriage has been brought into a position contiguous to the gun, and the main frame (as distinct from an upper frame carried by the main frame) raised into a position such that the said main frame is in alinement with the gun mounting. In one known arrangement of barrel carriage the means for lifting the main frame comprises a chain and sprocket arrangement by which the rear end of the trail is lifted from the ground and in rising brings suitable pieces on the trail and the main frame into engagement and thus raises the rear end of the carriage together with the rearward wheels so as to cause the said rear end to assume a position in which the slide on the carriage will lie opposite the gun slides of the mounting.

According to the present invention we so construct and arrange the barrel carriage that when the main frame of the barrel carriage is lifted, both the front and rear pair of wheels remain on the ground; by this means the lifting of the additional weight represented by the rear pair of wheels is avoided. We may also provide the rear end of the barrel carriage with rollers which are adapted to coöperate with the sides of the trail to guide the frame into position in line with the axis of the gun when the barrel carriage is being brought into position adjacent to the gun mounting ready to receive the gun. The said rollers are preferably so arranged that they can be adjusted to compensate for difference in height between the barrel carriage and the gun carriage.

The means for raising the rear end of the main frame of the barrel carriage (*i. e.* the end adjacent to the gun) may comprise screw elevating gear of such a character that the screws of such gear will take a bearing on the trail which will constitute an abutment or support for said screws during the lifting of the main frame.

In order that our said invention may be clearly understood and readily carried into effect we will describe the same more fully with reference to the accompanying drawings in which:—

Figure 1 is a side elevation of one constructional form of our improved barrel carriage arranged contiguous to a gun mounting, the barrel carriage being in position to be connected with the mounting. Fig. 2 is a similar view of the barrel carriage and the mounting showing the former connected to the mounting and in position to receive the gun from the said mounting. Fig. 3 is a transverse section taken approximately on the line 1, 1 of Fig. 1. Fig. 3ª is a fragmental side elevation showing the means for adjusting the guide rollers. Fig. 4 is a section taken approximately on the line 2, 2, of Fig. 2, and Fig. 5 is a side elevation similar to Fig. 2 showing another constructional form of the barrel carriage.

In these figures, A is the gun mounting, A' is the trail, B is the gun, C is the main frame of the barrel carriage and D, E are respectively the front and rear wheels of the said barrel carriage.

Referring more particularly to the construction shown in Figs. 1 to 4, the main frame C of the barrel carriage has slots $c$ formed in the sides and said slots are provided with stiffening pieces $c'$ which at the same time serve as guides for supporting the axle E' of the rear wheels. The said axle is cranked and has flat faces $E^x$ (Fig. 3) on its middle portion to form sliding surfaces for the said stiffening pieces $c'$. On the underside of the main frame C of the barrel carriage and toward its front end a support D' for the trail limber eye is provided, the said support being preferably constructed of steel plates and having at its lower end an upright or an inverted limber pin $D^x$. A hole is formed in the latter to receive a cotter pin when the said limber pin has engaged with the limber eye after the rear end of the trail has been lifted from the ground by means of hand-spikes, or handles $d$ provided on the trail. The said support D' may be hinged to the frame C at $d'$ so as to enable it to be swung into a position to lie against the underside of the main frame when traveling, as shown in broken lines in Fig. 1, the support being retained in this position by passing the cotter through a plate bracket on the underside of the frame and through the inverted pin. The front end of the main frame C is connected to the limber $D^2$ carrying the front wheels D by means of a swiveling limber eye $d^2$ as is well understood. The aforesaid gear for raising the rear end of the main frame C consists of two screws F F, carried in brackets one on either side of the barrel carriage frame and operated by means of worms $f^x$ which are connected together by a transverse shaft $f'$ having actuating handles $F'$ at its ends, the said worms gearing with worm wheels $F^x$ mounted on the screws F. The upper ends of the screws F are provided with collars $f^2$ (Fig. 4) which are preferably arranged to enable a small amount of adjustment to be obtained in the length of travel of the screws to allow for wear or to compensate for any "spring" that may take place in the material of which the main frame C is composed. The lower ends of the screws F are hemispherical as shown in Fig. 4 so as to center themselves, when the frame of the carriage is being elevated, in cup shaped bearings $A^x$ provided for the purpose on the sides of the trail $A'$. The aforesaid traversing gear is carried in a bracket G (Fig. 3) attached to one side of the rear axle $E'$, and comprises a screw $G'$ engaging with a rotary nut $g'$, the free end of the said screw being connected to a lug $G^2$ formed on the rear axle guides $c'$ of the barrel carriage, by means of a loose vertically arranged pin $g^2$ so that when the main frame C is lifted by means of the aforesaid elevating gear, the said loose pin will be released from the screw and so disconnect the traversing gear, thereby preventing damage being done to any of the parts of the traversing gear. The said gear is operated by a hand-wheel $G^x$ connected with the screw $G'$ by bevel wheels. This traversing gear serves (when necessary) to bring the guide rollers $G^3$ (Figs. 1 and 2) into proper position relatively to the trail sides while moving the barrel carriage up to the gun. As shown in Fig. $3^a$ each of the rollers $G^3$ is carried in a slide on the rear of the frame C and is connected to a link $g^3$ which is pivotally attached to one end of the lever $g^4$ pivoted at $g^x$ to the frame. The link $g^3$ and the lever $g^4$ by means of which the roller is moved are preferably inside the frame and are protected thereby.

At the forward end of the barrel carriage and between the sides of the main frame C thereof is fitted the usual hauling winch H (Fig. 2) for moving the gun from its mounting A on to the barrel carriage or vice versa. This winch is provided with an endless chain $h$ passing over sprocket wheels placed at either end of the barrel carriage, the one at the front end being connected to the winch by means of suitable gear-wheels. This winch may be operated by means of two handles $H^x$ arranged on opposite sides of the barrel carriage, and connected by means of a transverse shaft.

In the construction shown in Fig. 5 the lifting arrangement for the trail $A'$ and the main frame C of the barrel carriage comprises chain and sprocket gear K situated near the forward end of the barrel carriage, the lower end of the chain $k$ being adapted to be connected to an eye or the like $k'$ on the trail. The trail is also provided with two pairs of eyes, one pair $K'$ being situated near the rear end of the trail and the other pair $K^2$ near its forward end. These eyes are adapted to be connected by means of pins or the like to brackets $K'^x$ $K^{2x}$ formed on the underside of the main frame C so as to temporarily connect the trail and main frame of the barrel carriage together, the rear wheels of the barrel carriage remaining on the ground as in the previously described construction.

What we claim and desire to secure by Letters Patent of the United States is:—

1. The combination with the trail of a gun mounting, of a barrel carriage comprising front and rear pairs of wheels and axles therefor, a frame connecting said axles, slides on said frame for the reception of the barrel, and means coöperating between the trail and frame for raising the latter upon the rear axle without disconnection therefrom.

2. The combination with the trail of a gun mounting, of a barrel carriage comprising front and rear pairs of wheels and axles therefor, a frame connecting said axles, slides on said frame for the reception of the barrel, and means for enabling the frame to be raised, when the trail is raised, upon the rear pair axle without disconnection therefrom.

3. The combination with the trail of a gun mounting, of a barrel carriage comprising front and rear pairs of wheels and axles therefor, a frame connecting said axles, slides on said frame for the reception of the barrel, and an adjustable abutment coöperating between said trail and frame for raising the latter upon the rear axle without disconnection therefrom.

4. The combination with the trail of a gun mounting, of a barrel carriage comprising front and rear pairs of wheels and axles therefor, a frame connecting said axles, slides on said frame for the reception of the barrel, and an adjustable abutment for enabling the frame to be raised upon the rear axle when the trail is raised without disconnecting the frame from the axle.

5. The combination with the trail of a gun mounting, of a barrel carriage comprising front and rear pairs of wheels and axles therefor, a frame connecting said axles, slides on said frame for the reception of the barrel, and means whereby when the trail is raised the frame is raised upon the rear axle without disconnection therefrom.

6. The combination with the trail of a gun mounting, of a barrel carriage comprising a frame, slides thereon for the reception of the barrel, front and rear wheels and their axles, means coöperating between the trail and the frame for raising the latter without lifting the rear pair of wheels from the ground, and a slotted bracket on the frame to receive the rear axle.

7. The combination with the trail of a gun mounting, of a barrel carriage comprising a frame, slides thereon for the reception of the barrel, front and rear wheels and their axles, means coöperating between the trail and the frame for raising the latter without lifting the rear pair of wheels from the ground, a bracket on the frame, and a cranked portion on the rear axle engaging in a slot in said bracket.

8. In a barrel carriage for ordnance, the combination with the main frame, its slides for the reception of the barrel, and its front and rear pair of wheels, of means for enabling the main frame to be raised without lifting the rear pair of wheels from the ground, guide rollers carried by the main frame, and means for adjusting the height of the said rollers.

9. In a barrel carriage for ordnance, the combination with the main frame, its slides for the reception of the barrel, and its front and rear pair of wheels, of means for enabling the main frame to be raised without lifting the rear pair of wheels from the ground, screws carried by the main frame for engaging with the trail of the gun mounting, and worm mechanism for actuating said screws.

10. In a barrel carriage for ordnance, the combination with the main frame and its front and rear pair of wheels, of means for enabling the main frame to be raised without lifting the rear pair of wheels from the ground, screws carried by the main frame for engaging with the trail of the gun mounting, and means carried by the front of the main frame for engaging with the rear end of the trail.

11. In a barrel carriage for ordnance, the combination with the main frame and its front and rear pair of wheels of means for enabling the main frame to be raised without lifting the rear pair of wheels from the ground, screws carried by the main frame for engaging with the trail of the gun mounting, means carried by the front of the main frame for engaging with the rear end of the trail and a hauling winch also carried by the said main frame.

In testimony whereof we affix our signatures in presence of two witnesses.

ARTHUR TREVOR DAWSON.
GEORGE THOMAS BUCKHAM.

Witnesses:
ERNEST E. LARKINS,
HENRY KING.